No. 654,320. Patented July 24, 1900.
R. R. MORISON.
ELECTRIC HEATER.
(Application filed Nov. 15, 1899.)
(No Model.)

Witnesses,
Inventor
Robert R. Morison
By Dewey Strong & Co.
Attys

UNITED STATES PATENT OFFICE.

ROBERT R. MORISON, OF SAN FRANCISCO, CALIFORNIA.

ELECTRIC HEATER.

SPECIFICATION forming part of Letters Patent No. 654,320, dated July 24, 1900.

Application filed November 15, 1899. Serial No. 737,019. (No model.)

*To all whom it may concern:*

Be it known that I, ROBERT R. MORISON, a citizen of the United States, residing in the city and county of San Francisco, State of California, have invented an Improvement in Electric Heaters; and I hereby declare the following to be a full, clear, and exact description of the same.

My invention relates to a device which is especially designed for annealing gold for dental uses, for heating water, for sterilizing surgical or dental instruments, for heating wax composition of rubber and the like, for heating instruments for the preparation and convenient application of antiseptic dressings, and for any similar purposes to which it can be applied.

It consists of the parts and the constructions and combinations of parts hereinafter described and claimed.

Figure 1:
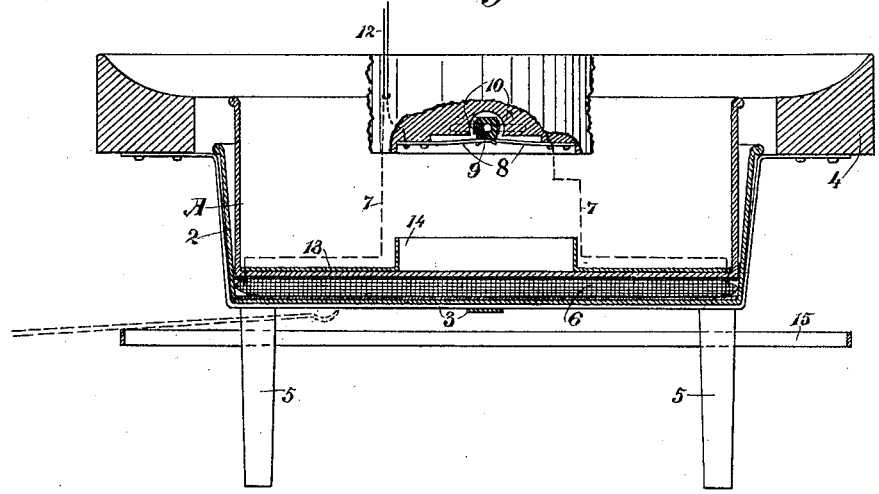
Figure 2:
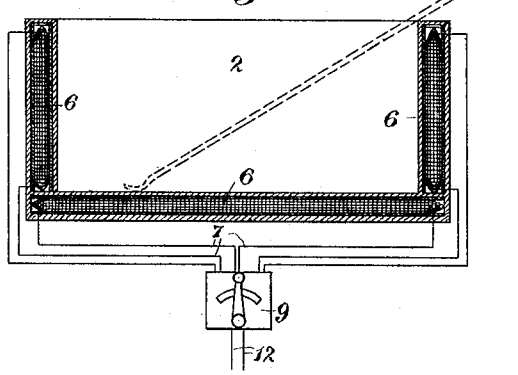

Figure 1 is a vertical section through the heater. Fig. 2 is a similar view showing a modification.

As shown in Fig. 1, the pan A is made circular, and it is adapted to fit into a shallow pan 2, having slightly-divergent sides and supporting-ribs 3, by which it is fixed to an annular stand 4, within which the two pans are suspended out of contact with the stand itself. This stand is provided with legs, as shown at 5, or may otherwise be suitably constructed. By the arrangement of the two pans the upper one, A, fits into the lower one, so as to leave a space or chamber between the two bottoms, and within this is fitted a resistance-coil 6, formed by winding wires of comparatively-low conducting power around insulating and heat-resisting material, such as mica or asbestos or equivalent substance which will serve the purposes required. Conducting-wires 7 extend from the resistance-coil through the lower pan, and in the rim of the annular table they are connected with elastic contact-points 8.

9 is a switch, which may be of any suitable or well-known description. I have here shown it in the form of a turnable key, having at the inner end a rectangular block of hard rubber or other insulating material, against which the switch-points will lie when the current is to be cut off, these points being separated sufficiently to prevent the current passing between them. Upon one of the sides of this square block is fixed a metal plate 10, so that when the block has been turned a quarter-revolution the switch-points will then rest upon this plate, and electrical connection will be made between them, so that the circuit is complete. This device represents any form of switch which it may be desirable to use in this connection.

The electrical current is brought to the apparatus through exterior conducting-wires 12, which may convey the current from any suitable source of electric energy.

Within the inner pan is a disk-shaped bottom 13, fitting the bottom of the pan and having a circular central opening with upturned flange 14. This disk is employed when gold is to be heated and annealed for dental uses. The pieces of gold leaf or pellets are placed in the central opening of the disk, and the electric current being turned on the pan will be heated sufficiently to properly anneal the gold. It is then only necessary to pick up the gold with the proper forceps, and its condition can be readily tested by pressing two pieces into contact to see if they will properly adhere. The small interior space and the upturned flange serve to confine these pieces of gold and to enable the operator to readily grasp and pick them up, pressing them against the side of the upturned flange. It also confines them to the center of the pan, where the resistance is arranged to produce the greatest heat.

If it is desired to heat water for the purpose of sterilizing the instruments or for other purposes, the disk is removed and a sufficient quantity of water is placed in the pan, which will soon be heated to any desired temperature up to boiling-point. The device is very useful for this and other purposes about an office.

As shown in Fig. 2, the pan is made rectangular and of sufficient length to contain surgical or other instruments which it may be desired to heat or sterilize, and in this case there are chambers formed at the sides as well as at the bottom. In each of these chambers (at the bottom, sides, and ends, if desired) a resistance-coil is placed, and each of these coils is connected with a source of electrical energy through a switch, so that any one or more of them can be placed in the circuit or cut out therefrom, and the rapidity with which the device can be heated will thus be regulated to suit conditions and circumstances.

The band 15, surrounding the legs supporting the device, is used to support dental instruments when it is desired to warm them to a comfortable temperature to relieve a patient from the shock of cold steel touching a sensitive part, the points of the instruments touching the lower part of the pan and resting across the band. They are thus kept warm and yet convenient to the operator's hand.

Having thus described my invention, what I claim as new, and desire to secure by Letters Patent, is—

1. An electrical heater comprising an open-center stand or support, a shallow pan within the opening of the stand or support, ribs by which said pan is suspended in the lower portion of said open center and out of direct contact with the stand, a second pan fitting within the first-named one, means interposed between the pans for electrically heating them, and means for controlling the electrical current.

2. The combination with a pan and means for heating the same, of an annular disk within and lying upon the bottom of said pan, and having a flanged opening which exposes a part of said bottom.

3. The combination with pans fitting one within the other and a heating medium between said pans, of a disk-shaped removable false bottom for the interior pan, having a flanged central opening exposing a portion of the bottom of the said pan and providing a restricted operating-surface.

4. The combination of a stand having legs or supports and a central opening, a pan suspended in said opening out of direct contact with the stand and a second pan interior to the first-named one, means interposed between the pans for electrically heating the pans and means for controlling the electrical current, and a support below the pans adapted to hold articles to be heated with their operative ends in contact with one of the pans.

In witness whereof I have hereunto set my hand.

ROBERT R. MORISON.

Witnesses:
S. H. NOURSE,
JESSIE C. BRODIE.